US010859938B2

(12) United States Patent
Saito et al.

(10) Patent No.: US 10,859,938 B2
(45) Date of Patent: Dec. 8, 2020

(54) CHARGING MEMBER FOR ELECTROPHOTOGRAPHIC EQUIPMENT

(71) Applicant: Sumitomo Riko Company Limited, Aichi (JP)

(72) Inventors: Yoshihiro Saito, Aichi (JP); Takeru Horiuchi, Aichi (JP); Shinkichi Kashihara, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/676,401

(22) Filed: Nov. 6, 2019

(65) Prior Publication Data

US 2020/0073273 A1    Mar. 5, 2020

Related U.S. Application Data

(63) Continuation of application No. PCT/JP2018/020130, filed on May 25, 2018.

(30) Foreign Application Priority Data

Jun. 29, 2017  (JP) .................................. 2017-127155

(51) Int. Cl.
*G03G 15/02*  (2006.01)
*G03G 15/20*  (2006.01)

(52) U.S. Cl.
CPC ..... *G03G 15/0233* (2013.01); *G03G 15/2057* (2013.01)

(58) Field of Classification Search
CPC ........... G03G 15/0216; G03G 15/0225; G03G 15/233; G03G 15/0808; G03G 15/0818; G03G 15/2057; G03G 21/1814

(Continued)

(56) References Cited

U.S. PATENT DOCUMENTS 6,454,688 B1 *  9/2002  Okuda ............... G03G 15/0233
                                                      428/35.9
8,523,748 B2 *  9/2013  Nagamine .......... G03G 15/0233
                                                      399/111

(Continued)

FOREIGN PATENT DOCUMENTS

JP            2012008384           1/2012

OTHER PUBLICATIONS

"International Search Report (Form PCT/ISA/210) of PCT/JP2018/020130," dated Jul. 17, 2018, with English translation thereof, pp. 1-4.

*Primary Examiner* — Hoan H Tran

(74) *Attorney, Agent, or Firm* — JCIPRNET

(57) ABSTRACT

The present disclosure provides a charging member for electrophotographic equipment capable of providing constant and excellent uniform chargeability over a long period of time from low-temperature and low-humidity through high-temperature and high-humidity environments, while suppressing bleeding. A charging member for electrophotographic equipment includes an elastic layer and a surface layer formed around the elastic layer. The elastic layer includes the following (a) through (c): (a) an ion conducting agent that is solid at room temperature; (b) an ion conducting agent that is liquid at room temperature; and (c) an electron conducting agent with an average grain diameter of 25 to 90 nm and a DBP absorption of 152 ml/100 g or below.

1 Claim, 1 Drawing Sheet

(58) Field of Classification Search
USPC .............. 399/107, 110, 115, 168, 174, 176; 264/104; 428/156, 446; 492/56, 59
See application file for complete search history.

(56) References Cited

U.S. PATENT DOCUMENTS

| | | | |
|---|---|---|---|
| 9,063,452 B2* | 6/2015 | Hagiwara | G03G 15/0233 |
| 10,025,215 B1* | 7/2018 | Morishige | G03G 15/0216 |
| 2013/0034369 A1* | 2/2013 | Masu | G03G 15/0233 |
| | | | 399/111 |
| 2013/0251406 A1* | 9/2013 | Hoshio | G03G 15/0233 |
| | | | 399/176 |
| 2018/0275552 A1* | 9/2018 | Satoh | G03G 15/0233 |

* cited by examiner

CHARGING MEMBER FOR ELECTROPHOTOGRAPHIC EQUIPMENT

CROSS-REFERENCE TO RELATED APPLICATION

This application is a continuation application of International Application number PCT/JP2018/020130 on May 25, 2018, which claims the priority benefit of Japan Patent Application No. 2017-127155, filed on Jun. 29, 2017. The entirety of each of the above-mentioned patent applications is hereby incorporated by reference herein and made a part of this specification.

TECHNICAL FIELD

The present disclosure relates to a charging member for electrophotographic equipment that is suitably used in electrophotographic equipment such as a copying machine, a printer, and a facsimile which use an electrophotographic method.

BACKGROUND ART

In a charging member for electrophotographic equipment, an ion conducting agent and an electron conducting agent are used for the purpose of reducing an electrical resistance value in order to secure a charging capacity. Charging members are classified into an ion type using an ion conducting agent, an electron type using an electron conducting agent, and a hybrid type using both.

PATENT LITERATURE

Patent Literature 1: Japanese Laid-open No. 2012-8384

Since an ion conducting agent generally has a low melting point or no melting point, the ion conducting agent has a very high dispersibility in a material and is suitable for uniform charging of a charging member. However, since an ion conducting agent is polarized and gradually consumed during use, the resistance of the charging member increases over time and the chargeability deteriorates. Therefore, manufacturers increase an applied bias over time and maintain chargeability to prevent deterioration of image quality. In addition, in a low temperature and low humidity environment, since movement of ions of the ion conducting agent slows down, and the resistance increases, the chargeability deteriorates. Therefore, manufacturers set an applied bias under a low temperature and low humidity environment to be higher than that of other environments (for example, under a high temperature and high humidity environment), and maintain chargeability to prevent deterioration of image quality.

Since an electron conducting agent has a resistance that is less affected by an external environment than an ion conducting agent, it is not necessary to set an applied bias for each environment. However, since an electron conducting agent has a larger particle size and lower dispersibility than an ion conducting agent, the chargeability in a charging member and between each charging member varies greatly. On the other hand, manufacturers maintain the chargeability by setting a large applied bias that is sufficient to absorb the variation in the chargeability to prevent deterioration of image quality.

However, when an applied bias increases, the chargeability of the charging member is maintained, but scraping of a photoreceptor is promoted due to excess discharging, and the lifespan is shortened. In addition, an amount of ozone increases. In addition, running costs increase. Therefore, it is necessary for the charging member to maintain the chargeability over time without changing an applied bias, have a resistance that is less affected by an external environment (environmental stability), and have a small variation in chargeability in the charging member and for each charging member (uniform chargeability) for a long period.

Here, Patent Literature 1 describes that carbon black and an ion conducting agent are used in combination in a charging member. However, it is not possible to prevent the ion conducting agent from bleeding due to use for a long period when both are simply used in combination.

SUMMARY

The present disclosure provides a charging member for electrophotographic equipment which has constant and excellent uniform chargeability over a long period and in which generation of bleeding is reduced in a low temperature and low humidity environment and a high temperature and high humidity environment.

A charging member for electrophotographic equipment according to the present disclosure includes an elastic layer and a surface layer formed on the outer periphery of the elastic layer, and the elastic layer includes the following components (a) to (c):
(a) an ion conducting agent that is a solid at normal temperature;
(b) an ion conducting agent that is a liquid at normal temperature; and
(c) an electron conducting agent having an average particle size of 25 to 90 nm, and a DBP absorption of 152 ml/100 g or less The DBP absorption is preferably in a range of 70 to 130 ml/100 g. A mass content ratio of the components (a) to (c) is preferably (a):(b):(c)=0.4 to 3.0:0.4 to 2.0:10 to 40. The content of the component (b) is preferably 2.0 parts by mass or less with respect to 100 parts by mass of polymer components. The content of the component (c) is preferably in a range of 10 to 40 parts by mass with respect to 100 parts by mass of polymer components. The component (a) and the component (b) are preferably one, two or more selected from among quaternary ammonium salts and quaternary phosphonium salts. Anions of the component (a) and the component (b) are preferably bis(trifluoromethanesulfonyl)imide ions or perchlorate ions. The thickness of the surface layer is preferably in a range of 3.0 to 15 µm.

DESCRIPTION OF THE EMBODIMENTS

The present disclosure will be described below in detail. The shape of a charging member for electrophotographic equipment according to the present disclosure is not particularly limited as long as it charges a member to be charged such as a photosensitive drum. A shape, for example, such as a roller shape, a plate shape, and a block shape, can be applied. A roller shape is particularly preferable. Hereinafter, a (charging roller) with a roller shape will be exemplified below.

Figure 1A:
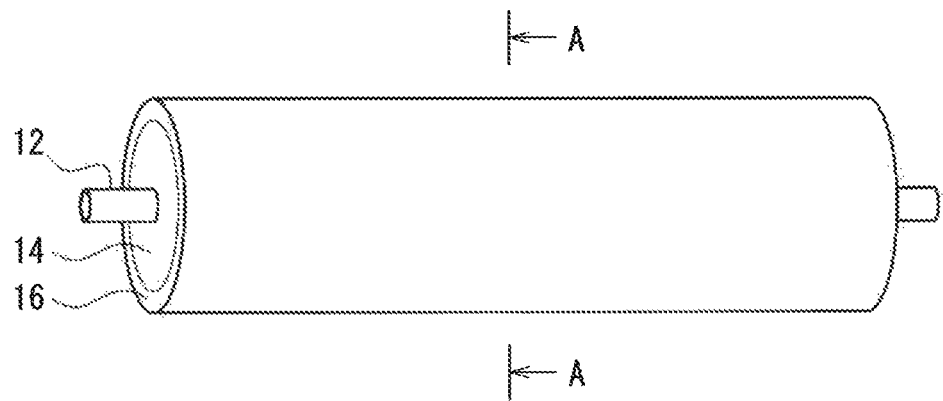
FIG. 1(a) is a schematic view of an appearance of a charging roller for electrophotographic equipment according to an embodiment of the present disclosure and FIG. 1(b) is a cross-sectional view taken along the line A-A.
Figure 1B:
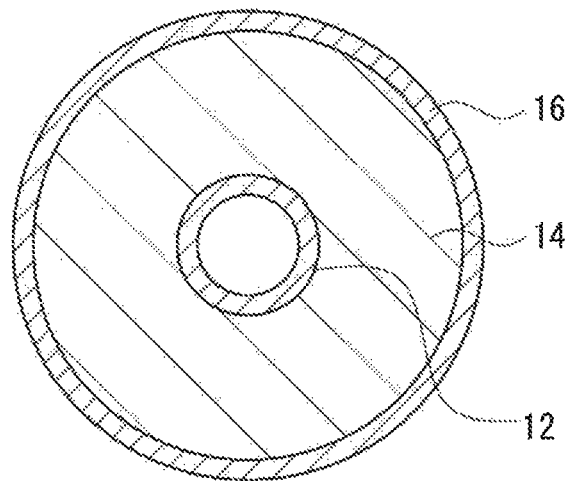

A charging roller for electrophotographic equipment (hereinafter simply referred to as a charging roller) according to the present disclosure will be described below in detail. FIG. 1(a) is a schematic view of an appearance of a charging roller for electrophotographic equipment according to an embodiment of the present disclosure, and FIG. 1(b) is a cross-sectional view taken along the line A-A.

A charging roller 10 includes a shaft 12, an elastic layer 14 formed on the outer periphery of the shaft 12, and a surface layer 16 formed on the outer periphery of the elastic layer 14. The elastic layer 14 is a layer serving as a base of the charging roller 10. The surface layer 16 is a layer appearing on the surface of the charging roller 10.

The elastic layer 14 contains the following components (a) to (c):

(a) an ion conducting agent that is a solid at normal temperature;

(b) an ion conducting agent that is a liquid at normal temperature; and (c) an electron conducting agent having an average particle size of 25 to 90 nm and a DBP absorption of 152 ml/100 g or less.

Since the ion conducting agent that is a liquid at normal temperature (hereinafter referred to as a liquid ion conducting agent) can greatly reduce the resistance of the elastic layer 14, it has an effect of improving the chargeability of the elastic layer 14 even when a relatively small amount is used. However, since ions of the liquid ion conducting agent easily move to the surface of the elastic layer 14 during current application, a large amount of the liquid ion conducting agent is consumed, and conductive durability of the elastic layer 14 deteriorates. Normal temperature is 25° C. This similarly applies below.

The ion conducting agent that is a solid at normal temperature (hereinafter referred to as a solid ion conducting agent) can reduce the resistance of the elastic layer 14, but the chargeability of the elastic layer 14 is not improved unless it is used in a relatively large amount. When a solid ion conducting agent is used to improve the chargeability of the elastic layer 14, a bloom of the solid ion conducting agent may be generated on the surface of the elastic layer 14. On the other hand, compared to the liquid ion conducting agent, movement of ions of the solid ion conducting agent during current application is slow and conductive durability of the elastic layer 14 becomes favorable. However, since the solid ion conducting agent has lower dispersibility than the liquid ion conducting agent, it tends to cause deterioration in the uniformity of the chargeability of the elastic layer 14.

Here, both the solid ion conducting agent and the liquid ion conducting agent are polar materials. Therefore, the solid ion conducting agent is more easily dispersed (dissolved) in the liquid ion conducting agent than a base rubber of the elastic layer 14. Therefore, since the solid ion conducting agent can be dispersed like the liquid ion conducting agent, the dispersibility of the solid ion conducting agent is improved by using it together with the liquid ion conducting agent. In addition, there is an effect of reducing deterioration of conductive durability of the elastic layer 14 by the solid ion conducting agent slowing movement of ions of the liquid ion conducting agent during current application due to an interaction between the solid ion conducting agent and the liquid ion conducting agent. In addition, there is an effect of reducing bleeding of the liquid ion conducting agent due to the interaction.

As described above, when the solid ion conducting agent and the liquid ion conducting agent are used in combination, it is possible to form a design in which it is possible to perform charging uniformly and well over a long period. However, in the ion conducting agent, the degree of freedom of molecules is greatly related to the resistance. Therefore, the resistance is likely to vary depending on the external environment. The chargeability also changes accordingly. Therefore, environmental stability of charge is poor when the solid ion conducting agent and the liquid ion conducting agent are simply used in combination. In addition, when the solid ion conducting agent and the liquid ion conducting agent are simply used in combination, it is not possible to simultaneously satisfy conductive durability of the elastic layer 14 and reduction of bleeding of the liquid ion conducting agent. When an amount of the liquid ion conducting agent is too small, it is not possible to satisfy conductive durability of the elastic layer 14, and when an amount of the liquid ion conducting agent is too large, bleeding of the liquid ion conducting agent is not reduced.

Since the electron conducting agent can reduce the resistance of the elastic layer 14, it has an effect of improving chargeability of the elastic layer 14. In addition, since the electron conducting agent is not affected by an external environment, environmental stability of charge becomes favorable. In addition, since consumption of the ion conducting agent is reduced by an amount of a current supplied to the electron conducting agent during current application, conductive durability of the elastic layer 14 becomes favorable. On the other hand, since the electron conducting agent has a larger particle size and lower dispersibility than the ion conducting agent, it deteriorates the uniform chargeability of the elastic layer 14. Thus, it is not possible to satisfy uniform chargeability of the elastic layer 14 when the ion conducting agent and the electron conducting agent are simply used in combination.

Here, the electron conducting agent used has a DBP absorption of 152 ml/100 g or less. The electron conducting agent has a smaller structure when it has a smaller DBP absorption. When the structure is smaller, there are more polar functional groups (such as —OH and —COOH) on the surface. In addition, when there are more polar functional groups, dispersion in the liquid ion conducting agent becomes easier due to the interaction. When the electron conducting agent has a DBP absorption of 152 ml/100 g or less, the electron conducting agent is easily dispersed in the liquid ion conducting agent, and dispersibility of the electron conducting agent is improved. Therefore, deterioration of uniform chargeability of the elastic layer 14 is reduced. In addition, there is an effect of reducing deterioration of conductive durability of the elastic layer 14 by the electron conducting agent slowing movement of ions of the liquid ion conducting agent during current application due to the interaction between the electron conducting agent and the liquid ion conducting agent. In addition, there is an effect of reducing bleeding of the liquid ion conducting agent due to the interaction.

In addition, the electron conducting agent used has an average particle size of 25 to 90 nm. When the particle size of the electron conducting agent is too small, a cohesive force is large and dispersion is difficult. When the average particle size of the electron conducting agent is 25 nm or more, aggregation is suppressed and dispersibility is improved. When the particle size of the electron conducting agent is too large, the number of particles per unit mass decreases, a conductive path is unlikely to be formed and favorable chargeability is unlikely to be obtained. When the average particle size of the electron conducting agent is 90 nm or less, a conductive path is easily formed and favorable chargeability is obtained.

As described above, when a liquid ion conducting agent and a specific electron conducting agent are used in combination, it is possible to obtain a design in which environmental stability of charge, conductive durability of the elastic layer 14, and uniform chargeability of the elastic layer 14 are satisfied. However, it is not possible to satisfy both chargeability and reduction of bleeding of a liquid ion conducting agent when the liquid ion conducting agent and a specific electron conducting agent are simply used in combination. When an amount of the liquid ion conducting agent is too small, it is not possible to have chargeability, and when an amount of the liquid ion conducting agent is too large, bleeding of the liquid ion conducting agent is not reduced. Thus, it is not possible to satisfy uniform chargeability of the elastic layer 14 when a solid ion conducting agent and a specific electron conducting agent are simply used in combination.

The present disclosure can compensate for such shortcomings, and when a solid ion conducting agent, a liquid ion conducting agent, and a specific electron conducting agent are used in combination, the solid ion conducting agent and the liquid ion conducting agent, and the liquid ion conducting agent and the specific electron conducting agent interact with each other, and chargeability, conductive durability of the elastic layer 14, environmental stability of charge, uniform chargeability of the elastic layer 14, and reduction of bloom and bleeding of the ion conducting agent can be satisfied. Therefore, in a low temperature and low humidity environment and a high temperature and high humidity environment, constant and excellent uniform chargeability can be maintained over a long period and generation of bleeding can be reduced.

The DBP absorption of the electron conducting agent is preferably 130 ml/100 g or less in order to improve dispersibility of the electron conducting agent according to the interaction with the liquid ion conducting agent and slowing movement of ions of the liquid ion conducting agent during current application due to the interaction with the liquid ion conducting agent. On the other hand, the DBP absorption is preferably 70 ml/100 g or more in order to appropriately reduce the interaction between the electron conducting agent and the liquid ion conducting agent so that movement of ions of the liquid ion conducting agent is not reduced too much. The DBP absorption is more preferably 80 ml/100 g or more, and most preferably 90 ml/100 g or more.

The DBP absorption of the electron conducting agent is calculated from an amount of DBP (dibutyl phthalate) that 100 g of the electron conducting agent absorbs according to JIS K6221.

The average particle size of the electron conducting agent is preferably 30 nm or more in order to improve dispersibility. In addition, the average particle size is preferably 80 nm or less in order to obtain favorable chargeability. The average particle size is more preferably 70 nm or less. The average particle size of the electron conducting agent is expressed as an arithmetic average size obtained by observing the electron conducting agent under an electronic microscope.

Preferably, the solid ion conducting agent (a), the liquid ion conducting agent (b), and the specific electron conducting agent (c) are added in predetermined proportions. Specifically, a mass content ratio of components (a) to (c) is preferably (a):(b):(c)=0.4 to 3.0:0.4 to 2.0:10 to 40. When the proportion of the specific electron conducting agent increases, uniform chargeability of the elastic layer 14 is easily reduced. When the proportion of the ion conducting agent increases, environmental stability of charge easily deteriorates. When the proportion of the liquid ion conducting agent increases, bleeding of the liquid ion conducting agent easily occurs. When the proportion of the liquid ion conducting agent decreases, chargeability, and dispersibility of the solid ion conducting agent and the specific electron conducting agent are easily reduced. When the proportion of the solid ion conducting agent increases, uniform chargeability of the elastic layer 14 easily deteriorates. When the proportion of the solid ion conducting agent decreases, an effect of reducing bleeding of the liquid ion conducting agent is easily weakened.

The content of the component (a) is preferably 3.0 parts by mass or less with respect to 100 parts by mass of polymer components contained in the elastic layer 14 in order to easily reduce bleeding (bloom) of the solid ion conducting agent. In addition, the content is preferably 2.0 parts by mass or less with respect to 100 parts by mass of polymer components contained in the elastic layer 14 in order to improve environmental stability of charge. The content is more preferably 1.5 parts by mass or less. On the other hand, the content of the component (a) is preferably 0.5 parts by mass or more with respect to 100 parts by mass of polymer components in order to obtain a superior effect of reducing bleeding of the liquid ion conducting agent.

The content of the component (b) is preferably 2.0 parts by mass or less with respect to 100 parts by mass of polymer components contained in the elastic layer 14 in order to easily reduce bleeding of the liquid ion conducting agent. In addition, the content is preferably 1.5 parts by mass or less with respect to 100 parts by mass of polymer components contained in the elastic layer 14 in order to improve environmental stability of charge. On the other hand, the content of the component (b) is preferably 0.5 parts by mass or more with respect to 100 parts by mass of polymer components contained in the elastic layer 14 in order to obtain a superior effect of improving chargeability and uniform chargeability of the elastic layer 14.

The content of the component (c) is preferably 10 parts by mass or more with respect to 100 parts by mass of polymer components contained in the elastic layer 14 in order to obtain a superior effect of improving environmental stability of charge. In addition, the content is preferably 15 parts by mass or more with respect to 100 parts by mass of polymer components contained in the elastic layer 14 in order to obtain a superior effect of reducing bleeding of the liquid ion conducting agent. On the other hand, the content of the component (c) is preferably 40 parts by mass or less with respect to 100 parts by mass of polymer components contained in the elastic layer 14 in order to easily reduce deterioration of uniform chargeability of the elastic layer 14. The content is more preferably 30 parts by mass or less.

Examples of the solid ion conducting agent and the liquid ion conducting agent include quaternary ammonium salts, quaternary phosphonium salts, borates, and surfactants.

Examples of the quaternary ammonium salts and quaternary phosphonium salts include those including one, two, or more of an alkyl group or aryl group having about 1 to 18 carbon atoms (such as a methyl group, an ethyl group, a propyl group, a butyl group, a hexyl group, an octyl group, a decyl group, a phenyl group, and a xylyl group) and including a halogen ion and an anion such as $ClO_4^-$, $BF_4^-$, $SO_4^{2-}$, $HSO_4^-$, $C_2H_5SO_4^-$, $CF_3COO^-$, $CF_3SO_3^-$, $(CF_3SO_2)_2N^-$, $PF_6^-$, $(CF_3CF_2SO_2)_2N^-$, $CF_3(CF_2)_3SO_3^-$, $(CF_3SO_2)_3C^-$, and $CF_3(CF_2)_2COO^-$.

Examples of the borate include those including one, two, or more of an alkyl group or aryl group having about 1 to 18 carbon atoms (such as a methyl group, an ethyl group, a propyl group, a butyl group, a hexyl group, an octyl group, a decyl group, a phenyl group, and a xylyl group) and including an alkali metal ion such as a lithium ion, a sodium ion, a potassium ion, and a calcium ion, or an alkaline earth metal ion.

Examples of the quaternary ammonium salts as solid ion conducting agents include tetraalkylammonium salts in which all four alkyl groups are the same and tetraarylammonium salts in which all four aryl groups are the same. More specifically, tetrabutylammonium perchlorate and the like may be exemplified. Examples of the quaternary phosphonium salts as solid ion conducting agents include tetraalkylphosphonium salts in which all four alkyl groups are the same and tetraarylphosphonium salts in which all four aryl groups are the same. More specifically, tetrabutylphosphonium=bis(trifluoromethanesulfonyl)imide and the like may be exemplified.

Examples of the quaternary ammonium salts as liquid ion conducting agents include ammonium salts in which one of four alkyl groups is different from the other groups and ammonium salts in which one of four aryl groups is different from the other groups. More specifically, trimethylhexyl ammonium=bis(trifluoromethanesulfonyl)imide and the like may be exemplified. Examples of the quaternary phosphonium salts as liquid ion conducting agents include phosphonium salts in which one of four alkyl groups is different from the other groups and phosphonium salts in which one of four aryl groups is different from the other groups. More specifically, tributyldodecyl phosphonium=bis(trifluoromethanesulfonyl)imide and the like may be exemplified. Regarding the borate as the liquid ion conducting agent, more specifically, 1-ethyl-3-methylimidazolium tetrafluoroborate and the like may be exemplified.

The components (a) and (b) are preferably one, two, or more selected from among quaternary ammonium salts and quaternary phosphonium salts in order that the components (a) and (b) can easily interact with each other, that is, in order to easily disperse (dissolve) the solid ion conducting agent in the liquid ion conducting agent, and for the solid ion conducting agent to easily slow movement of ions of the liquid ion conducting agent during current application. In this case, the components (a) and (b) may be of the same type or of different types. Examples of the same type include a type in which the components (a) and (b) are both quaternary ammonium salts and a type in which the components (a) and (b) are both quaternary phosphonium salts. In addition, in the components (a) and (b), an anion is preferably a bis(trifluoromethanesulfonyl)imide ion (($CF_3CF_2SO_2)_2N^-$) or a perchlorate ion ($ClO_4^-$).

Examples of the electron conducting agent (c) include conductive oxides such as carbon black, graphite, c-$TiO_2$, c-ZnO, and c-$SnO_2$ (c—indicates conductivity). Among these, carbon black and graphite are preferable because they have many polar functional groups and are easily dispersed in the liquid ion conducting agent.

The elastic layer 14 contains a base rubber (polymer component). Therefore, the elastic layer 14 becomes a layer having rubber elasticity. The elastic layer 14 is formed of a conductive rubber composition including the components (a) to (c) and a base rubber. The base rubber (crosslinked rubber) is obtained by crosslinking an uncrosslinked rubber. The uncrosslinked rubber may be a polar rubber or a nonpolar rubber. The uncrosslinked rubber is more preferably a polar rubber in order to obtain excellent conductivity.

The polar rubber is a rubber having a polar group, and examples of the polar group include a chloro group, a nitrile group, a carboxyl group, and an epoxy group. Specific examples of the polar rubber include hydrin rubber, nitrile rubber (NBR), urethane rubber (U), acrylic rubber (a copolymer of acrylic ester and 2-chloroethyl vinyl ether, ACM), chloroprene rubber (CR), and epoxidized natural rubber (ENR). Among polar rubbers, hydrin rubber and nitrile rubber (NBR) are more preferable in order to particularly easily reduce the volume resistivity.

Examples of the hydrin rubber include epichlorohydrin homopolymer (CO), epichlorohydrin-ethylene oxide binary copolymer (ECO), epichlorohydrin-allyl glycidyl ether binary copolymer (GCO), and epichlorohydrin-ethylene oxide-allyl glycidyl ether terpolymer (GECO).

Examples of the urethane rubber include a polyether urethane rubber having an ether bond in the molecule. The polyether urethane rubber can be produced according to the reaction between a polyether having a hydroxyl group at both ends and a diisocyanate. The polyether is not particularly limited, and examples thereof include a polyethylene glycol and a polypropylene glycol. The diisocyanate is not particularly limited, and examples thereof include tolylene diisocyanate and diphenylmethane diisocyanate.

Examples of the nonpolar rubber include isoprene rubber (IR), natural rubber (NR), styrene butadiene rubber (SBR), and butadiene rubber (BR).

Examples of the crosslinking agent include a sulfur crosslinking agent, a peroxide crosslinking agent, and a dechlorination crosslinking agent. These crosslinking agents may be used alone or two or more thereof may be used in combination.

Examples of the sulfur crosslinking agent include sulfur crosslinking agents known in the related art such as powdered sulfur, precipitated sulfur, colloidal sulfur, surface-treated sulfur, insoluble sulfur, sulfur chloride, a thiuram vulcanization accelerator, and a polymer polysulfide.

Examples of the peroxide crosslinking agent include peroxide crosslinking agents known in the related art such as peroxyketal, dialkyl peroxide, peroxy ester, ketone peroxide, peroxy dicarbonate, diacyl peroxide, and hydroperoxide.

Examples of the dechlorination crosslinking agent include a dithiocarbonate compound. More specifically, quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like may be exemplified.

In order to reduce bleeding, an amount of the crosslinking agent added is preferably in a range of 0.1 to 2 parts by mass, more preferably in a range of 0.3 to 1.8 parts by mass, and most preferably in a range of 0.5 to 1.5 parts by mass with respect to 100 parts by mass of the uncrosslinked rubber.

When a dechlorination crosslinking agent is used as the crosslinking agent, a dechlorination crosslinking accelerator may be used in combination. Examples of the dechlorination crosslinking accelerator include 1,8-diazabicyclo(5,4,0)undecene-7 (hereinafter referred to as a DBU) and weak acid salts thereof. The dechlorination crosslinking accelerator may be used in a form of DBU, but it is preferably used in a form of weak acid salts thereof in consideration of handling. Examples of the weak acid salts of DBU include carbonate, stearate, and 2-ethylhexyl acid salts, benzoate, salicylate, 3-hydroxy-2-naphthoate, and phenolic resin salts, 2-mercaptobenzothiazole salts, and 2-mercapto benzimidazole salts.

In order to reduce bleeding, the content of the dechlorination crosslinking accelerator is preferably in a range of 0.1 to 2 parts by mass with respect to 100 parts by mass of the uncrosslinked rubber. The content is more preferably in a range of 0.3 to 1.8 parts by mass and most preferably in a range of 0.5 to 1.5 parts by mass.

Various additives may be appropriately added to the elastic layer 14 as necessary. Examples of the additives include a lubricant, a vulcanization accelerator, an antioxidant, a light stabilizer, a viscosity adjusting agent, a processing aid, a flame retardant, a plasticizer, a foaming agent, a filler, a dispersant, a defoaming agent, a pigment, and a mold release agent.

The volume resistivity of the elastic layer 14 can be adjusted to a predetermined value according to the type of a crosslinked rubber, an amount of the ion conducting agent added, and addition of the electron conducting agent. The volume resistivity of the elastic layer 14 may be appropriately set to be within ranges of $10^2$ to $10^{10}$ Ω·cm, $10^3$ to $10^9$ Ω·cm, and $10^4$ to $10^8$ Ω·cm depending on applications and the like.

The thickness of the elastic layer 14 is not particularly limited, and it may be appropriately set to be within a range of 0.1 to 10 mm depending on applications and the like. The elastic layer 14 may be a foamed article or a non-foamed article.

For example, the elastic layer 14 can be produced as follows. First, the shaft 12 is coaxially placed in a hollow part of a roller mold for molding, an uncrosslinked conductive rubber composition is injected, and heated and cured (crosslinked), and demolding is then performed, or an uncrosslinked conductive rubber composition is extruded and molded on the surface of the shaft 12 and thereby the elastic layer 14 is formed on the outer periphery of the shaft 12.

The surface layer 16 contains a binder. Examples of the binder include a (meth)acrylic resin (an acrylic resin and a methacrylic resin), a fluorine resin, a polyamide, a polyurethane, a polycarbonate, a melamine resin, and a silicone resin. Regarding the binder of the surface layer 16, these may be used alone or two or more thereof may be used in combination. Among these, a (meth)acrylic resin, a fluorine resin, and a polycarbonate are more preferable in consideration of surface properties.

The surface layer 16 may or may not contain roughness exhibiting particles for exhibiting roughness on the surface of the surface layer and an additive. Examples of the additive include a conducting agent, a filler, a stabilizer, a UV absorber, a lubricant, a release agent, dye, a pigment, and a flame retardant.

Examples of the conducting agent include an ion conducting agent and an electron conducting agent. Examples of the ion conducting agent include quaternary ammonium salts, quaternary phosphonium salts, borates, and surfactants. Examples of the electron conducting agent include conductive oxides such as carbon black, graphite, c-$TiO_2$, c-ZnO, and c-$SnO_2$ (c-indicates conductivity).

The volume resistivity of the surface layer 16 can be adjusted to a predetermined value according to the type of material, addition of a conducting agent, and the like. The volume resistivity of the surface layer 16 may be appropriately set to be within ranges of $10^5$ to $10^{11}$ Ω·cm, and $10^8$ to $10^{10}$ Ω·cm depending on applications and the like.

The thickness of the surface layer 16 is preferably 15 μm or less in order to easy obtain favorable chargeability. The thickness is more preferably 12 μm or less. In addition, the thickness is preferably 3.0 μm or more in order to easily reduce bleeding and blooming of the conducting agent on the surface of a charging member 10. The thickness is more preferably 5.0 μm or more.

The surface layer 16 can be formed by applying a composition for forming a surface layer to the outer peripheral surface of the elastic layer 14 and drying it. The composition for forming a surface layer contains a binder. In addition, as necessary, particles for exhibiting roughness are contained. In addition, one, two, or more of various additives added to the surface layer are contained as necessary. In addition, a solvent is contained as necessary.

The shaft 12 is not particularly limited as long as it has conductivity. Specifically, a solid component made of a metal such as iron, stainless steel, and aluminum, and core metal made of a hollow component may be exemplified. As necessary, an adhesive, a primer, and the like may be applied to the surface of the shaft 12. That is, the elastic layer 14 may be adhered to the shaft 12 via an adhesive layer (primer layer). The adhesive, the primer, and the like may be made conductive as necessary.

According to the charging roller 10 having the above configuration, when the elastic layer 14 contains (a) an ion conducting agent that is a solid at normal temperature, (b) an ion conducting agent that is a liquid at normal temperature, and (c) an electron conducting agent having an average particle size of 25 to 90 nm, and a DBP absorption 152 ml/100 g or less, in a low temperature and low humidity environment and a high temperature and high humidity environment, constant and excellent uniform chargeability is maintained over a long period and generation of bleeding is reduced.

The configuration of the charging roller according to the present disclosure is not limited to the configuration shown in FIG. 1. For example, a configuration in which another elastic layer is provided between the shaft 12 and the elastic layer 14 in the charging roller 10 shown in FIG. 1 may be used. In this case, the other elastic layer is a layer serving as a base of the charging roller, and the elastic layer 14 functions as a resistance adjustment layer for adjusting the resistance of the charging roller. For example, the other elastic layer can be made of any of materials exemplified as the material constituting the elastic layer 14. In addition, for example, a configuration in which another elastic layer is provided between the elastic layer 14 and the surface layer 16 in the charging roller 10 shown in FIG. 1 may be used. In this case, the elastic layer 14 is a layer serving as a base of the charging roller, and the other elastic layer functions as a resistance adjustment layer for adjusting the resistance of the charging roller.

EXAMPLES

The present disclosure will be described below in detail with reference to examples and comparative examples.

Examples 1 to 13, and Comparative Examples 1 to 3

<Preparation of Conductive Rubber Composition>

5 parts by mass of a vulcanization aid (zinc oxide, commercially available from Mitsu Mining & Smelting Co., Ltd. "2 types of zinc oxide"), 0.5 parts by mass of a vulcanization accelerator (2-mercaptobenzothiazole, "Nocceller M-P" commercially available Ouchi Shinko Chemical Industrial Co., Ltd.), 2 parts by mass of sulfur ("Sulfax PTC" commercially available from Tsurumi Chemical Industry Co., Ltd.), and 50 parts by mass of a filler (calcium carbonate, "Hakuenka CC" commercially available from Shiraishi Kogyo Co., Ltd.) were added to 100 parts by mass of hydrin rubber (ECO, "Epichlomer CG102" commercially available from Daiso), and an electron conducting agent and an ion conducting agent were added in amounts shown in Table 1, and these were stirred and mixed using a stirrer to prepare a conductive rubber composition.

Details of the electron conducting agent and the ion conducting agent used to prepare the conductive rubber composition were as follows. The DBP absorption and the average size of the electron conducting agent were catalog values. The solid ion conducting agent was an ion conducting agent that was a solid at normal temperature (25° C.), and the liquid ion conducting agent was an ion conducting agent that was a liquid at normal temperature (25° C.).

Electron conducting agent (1): carbon black ("Asahi #60H" commercially available from Asahi Carbon Co., Ltd.)

Electron conducting agent (2): carbon black ("Seast FY" commercially available from Tokai Carbon Co., Ltd.)

Electron conducting agent (3): carbon black ("Asahi #50U" commercially available from Asahi Carbon Co., Ltd.)

Electron conducting agent (4): carbon black ("Nitetron #S" commercially available from NSCC Carbon Co., Ltd.)

Electron conducting agent (5): carbon black ("Seast KH" commercially available from Tokai Carbon Co., Ltd.)

Electron conducting agent (6): carbon black ("Asahi F-200" commercially available from Asahi Carbon Co., Ltd.)

Electron conducting agent (7): carbon black ("Asahi #51" commercially available from Asahi Carbon Co., Ltd.)

Electron conducting agent (8): carbon black ("Seast 600" commercially available from Tokai Carbon Co., Ltd.)

Solid ion conducting agent (1) P type: tetrabutylphosphonium=bis(trifluoromethanesulfonyl) imide (reagent)

Solid ion conducting agent (2) N type: tetrabutylammonium perchlorate (reagent)

Liquid ion conducting agent (1) N type: trimethylhexyl ammonium=bis(trifluoromethanesulfonyl)imide (reagent)

Liquid ion conducting agent (2) P type: tributyldodecyl phosphonium=bis(trifluoromethanesulfonyl)imide (reagent)

<Production of Elastic Layer>

Core metal (shaft, diameter of 6 mm) was set in a mold for molding (pipe shape), the conductive rubber composition was injected, heated at 180° C. for 30 minutes, and then cooled and demolded, and thereby an elastic layer with a thickness of 1.9 mm was formed on the outer periphery of the core metal.

<Production of Surface Layer>

A binder resin (N-methoxymethylated nylon, "EF30T" commercially available from Nagase ChemteX Corporation) was used, methyl ethyl ketone (MEK) was added so that a solid content concentration was 20 mass %, and mixing and stirring were performed, and thereby a liquid composition for forming a surface layer was prepared. Next, the liquid composition was applied to the outer peripheral surface of an elastic layer in a roll coating manner, a heat treatment was performed, and thereby a surface layer (with a thickness of 10 μm) was formed on the outer periphery of the elastic layer. Thereby, a charging roller was produced.

Comparative Example 4

A conductive rubber composition was prepared and a charging roller was produced in the same manner as in the example except that no electron conducting agent was added in preparation of a conductive rubber composition.

Comparative Examples 5 and 6

A conductive rubber composition was prepared and a charging roller was produced in the same manner as in the example except that no solid ion conducting agent was added in preparation of a conductive rubber composition.

Comparative Examples 7 and 8

A conductive rubber composition was prepared and a charging roller was produced in the same manner as in the example except that no liquid ion conducting agent was added in preparation of a conductive rubber composition.

Comparative Example 9

A conductive rubber composition was prepared and a charging roller was produced in the same manner as in the example except that no electron conducting agent and liquid ion conducting agent were added in preparation of a conductive rubber composition.

Chargeability, change in charge over time (conductive durability), environmental stability of charge, uniform chargeability, and bleed resistance (reducing bleeding and bloom) of the produced charging rollers were evaluated. In addition, leak-out of the comparative examples was also evaluated.

(Chargeability)

The produced charging rollers were assembled in an actual machine ("MPC5503" commercially available from RICOH), and under a 15° C.×10% RH environment, a voltage applied to the charging roller that was adjusted so that the first printed image became a favorable print was determined. A lower voltage indicates a better result. "⊚" indicates a voltage of 1.25 kV or lower, "O" indicates a voltage of 1.26 kV to 1.30 kV, and "x" indicates a voltage of 1.31 kV or higher.

(Change in Charge Over Time)

The produced charging rollers were assembled in an actual machine ("MPC5503" commercially available from RICOH), and under a 15° C.×10% RH environment, a voltage difference applied to the charging rollers for the first and $500,000^{th}$ printed images was determined. A smaller voltage difference indicates a better result. "⊚" indicates a voltage difference of 0.10 kV or lower, "O" indicates a voltage difference of 0.11 kV to 0.20 kV, and "x" indicates a voltage difference of 0.21 kV or higher.

(Environmental Stability of Charge)

The produced charging rollers were assembled in an actual machine ("MPC5503" commercially available from RICOH), and a voltage difference applied to the charging rollers in a low temperature and low humidity environment LL (15° C.×10% RH) and a high temperature and high humidity environment HH (35° C.×85% RH) was determined. A smaller voltage difference indicates a better result. "⊚" indicates a voltage difference of 0.10 kV or lower, "O" indicates a voltage difference of 0.11 kV to 0.15 kV, and "x" indicates a voltage difference of 0.16 kV or higher.

(Uniform Chargeability)

5 charging rollers treated in the same manner were prepared, and assembled in an actual machine ("MPC5503" commercially available from RICOH), under a 15° C.×10% RH environment, a voltage applied to the charging roller that was adjusted so that the first printed image became a favorable print was measured, and a difference between the highest voltage and the lowest voltage was determined. A smaller voltage difference indicates a better result. "⊚" indicates a voltage difference of 0.05 kV or lower, "O" indicates a voltage difference of 0.06 kV to 0.10 kV, and "x" indicates a voltage difference of 0.11 kV or higher.

(Bleed Resistance)

5 charging rollers treated in the same manner were prepared, and assembled in an actual machine ("MPC5503" commercially available from RICOH), and when 500,000 images were printed under a 15° C.×10% RH environment, it was determined whether the ion conducting agent was exuded on the surface of the roller. "x" indicates that exudation of the ion conducting agent was confirmed, "O" indicates that a small amount of the ion conducting agent exuded was confirmed, but it had no influence on the image, and "⊚" indicates that no exudation of the ion conducting agent was confirmed.

According to Examples 1, 6, 7, and 9 to 12, and Comparative Examples 4 to 8, it was found that, when the liquid ion conducting agent, the solid ion conducting agent, and the electron conducting agent were used in combination, chargeability, conductive durability, environmental stability of charge, uniform chargeability, and bleed resistance were adequate. In Comparative Example 4, conductive durability, and environmental stability of charge were not adequate when the liquid ion conducting agent and the solid ion conducting agent were simply used in combination. In Comparative Examples 7 and 8, uniform chargeability was not adequate when the solid ion conducting agent and the electron conducting agent were simply used in combination. In Comparative Examples 5 and 6, it was not possible to satisfy both chargeability and bleed resistance when the liquid ion conducting agent and the electron conducting agent were simply used in combination.

However, therefore, in Examples 1 to 5 and Comparative Examples 1 to 3, it was necessary for the DBP absorption of

TABLE 1

|  | DBP absorption ml/100 g | Average size μm | Examples | | | | | | | | | | | | |
|---|---|---|---|---|---|---|---|---|---|---|---|---|---|---|---|
|  |  |  | 1 | 2 | 3 | 4 | 5 | 6 | 7 | 8 | 9 | 10 | 11 | 12 | 13 |
| Electron conducting agent (1) | 120 | 40 | 20 | — | — | — | — | 20 | 20 | 40 | 20 | 20 | 20 | 20 | 10 |
| Electron conducting agent (2) | 152 | 72 | — | 20 | — | — | — | — | — | — | — | — | — | — | — |
| Electron conducting agent (3) | 65 | 68 | — | — | 20 | — | — | — | — | — | — | — | — | — | — |
| Electron conducting agent (4) | 64 | 90 | — | — | — | 20 | — | — | — | — | — | — | — | — | — |
| Electron conducting agent (5) | 120 | 25 | — | — | — | — | — | — | — | — | — | — | — | — | — |
| Electron conducting agent (6) | 180 | 38 | — | — | — | — | — | — | — | — | — | — | — | — | — |
| Electron conducting agent (7) | 70 | 95 | — | — | — | — | — | — | — | — | — | — | — | — | — |
| Electron conducting agent (8) | 80 | 22 | — | — | — | — | — | — | — | — | — | — | — | — | — |
| Solid ion conducting agent (1) P type |  |  | 1.0 | 1.0 | 1.0 | 1.0 | 1.0 | 1.0 | — | 1.0 | 3.0 | 3.5 | 1.0 | 1.0 | 1.0 |
| Solid ion conducting agent (2) N type |  |  | — | — | — | — | — | — | 1.0 | — | — | — | — | — | — |
| Liquid ion conducting agent (1) N type |  |  | 1.0 | 1.0 | 1.0 | 1.0 | 1.0 | — | 1.0 | 1.0 | 1.0 | 1.0 | 2.0 | 2.2 | 1.0 |
| Liquid ion conducting agent (2) P type |  |  | — | — | — | — | — | 1.0 | — | — | — | — | — | — | — |
| ECO |  |  | 100 | 100 | 100 | 100 | 100 | 100 | 100 | 100 | 100 | 100 | 100 | 100 | 100 |
| Chargeability |  |  | ⊚ | O | ⊚ | O | O | ⊚ | ⊚ | O | ⊚ | ⊚ | ⊚ | ⊚ | ⊚ |
| Conductive durability |  |  | ⊚ | ⊚ | ⊚ | ⊚ | ⊚ | ⊚ | ⊚ | ⊚ | ⊚ | ⊚ | ⊚ | ⊚ | O |
| Environmental stability |  |  | ⊚ | ⊚ | ⊚ | O | ⊚ | ⊚ | ⊚ | ⊚ | O | O | O | O | O |
| Uniform chargeability |  |  | ⊚ | O | ⊚ | O | O | ⊚ | ⊚ | O | ⊚ | ⊚ | ⊚ | ⊚ | ⊚ |
| Bleed resistance |  |  | ⊚ | ⊚ | ⊚ | ⊚ | ⊚ | ⊚ | ⊚ | ⊚ | ⊚ | O | ⊚ | O | ⊚ |

TABLE 2

|  | DBP absorption ml/100 g | Average size μm | Comparative Examples | | | | | | | | |
|---|---|---|---|---|---|---|---|---|---|---|---|
|  |  |  | 1 | 2 | 3 | 4 | 5 | 6 | 7 | 8 | 9 |
| Electron conducting agent (1) | 120 | 40 | — | — | — | — | 20 | 20 | 20 | 20 | — |
| Electron conducting agent (2) | 152 | 72 | — | — | — | — | — | — | — | — | — |
| Electron conducting agent (3) | 65 | 68 | — | — | — | — | — | — | — | — | — |
| Electron conducting agent (4) | 64 | 90 | — | — | — | — | — | — | — | — | — |
| Electron conducting agent (5) | 120 | 25 | — | — | — | — | — | — | — | — | — |
| Electron conducting agent (6) | 180 | 38 | 20 | — | — | — | — | — | — | — | — |
| Electron conducting agent (7) | 70 | 95 | — | 20 | — | — | — | — | — | — | — |
| Electron conducting agent (8) | 80 | 22 | — | — | 20 | — | — | — | — | — | — |
| Solid ion conducting agent (1) P type |  |  | 1.0 | 1.0 | 1.0 | 1.0 | — | — | 1.0 | 2.0 | 1.0 |
| Solid ion conducting agent (2) N type |  |  | — | — | — | — | — | — | — | — | — |
| Liquid ion conducting agent (1) N type |  |  | 1.0 | 1.0 | 1.0 | 1.0 | 1.0 | 2.0 | — | — | — |
| Liquid ion conducting agent (2) P type |  |  | — | — | — | — | — | — | — | — | — |
| ECO |  |  | 100 | 100 | 100 | 100 | 100 | 100 | 100 | 100 | 100 |
| Chargeability |  |  | ⊚ | X | X | ⊚ | X | ⊚ | X | O | X |
| Conductive durability |  |  | ⊚ | X | X | X | ⊚ | O | O | O | X |
| Environmental stability |  |  | ⊚ | X | X | X | O | O | ⊚ | ⊚ | X |
| Uniform chargeability |  |  | X | X | X | ⊚ | O | ⊚ | X | X | X |
| Bleed resistance |  |  | ⊚ | ⊚ | ⊚ | O | ⊚ | X | O | O | O | the electron conducting agent to be 152 ml/100 g or less, and the average particle size of the electron conducting agent to be 25 to 90 nm. When the DBP absorption of the electron conducting agent was larger, because of the structure was larger, there were few polar functional groups on the surface, dispersion in the liquid ion conducting agent deteriorated, and uniform dispersion in the entire elastic layer was difficult. Therefore, uniform chargeability deteriorated. When the average particle size of the electron conducting agent was too small, the electron conducting agent was strongly aggregated, and uniform dispersion in the entire elastic layer was difficult. When the average particle size of the electron conducting agent was too large, it was difficult to uniformly form a conductive path in the entire elastic layer. Therefore, uniform chargeability deteriorated. In addition, when the average particle size of the electron conducting agent was too small or too large (was not appropriate), an effect obtained when the electron conducting agent was added was not sufficiently exhibited, and chargeability, conductive durability, and environmental stability of charge also deteriorated.

Thus, according to Examples 1, 6, 7, and 9 to 12, and Comparative Examples 4, and 7 to 9, it was found that the dispersibility of the solid ion conducting agent was improved and the uniform chargeability was improved by using it together with the liquid ion conducting agent. Therefore, it was found that, since the solid ion conducting agent exhibited the same high dispersibility as the liquid ion conducting agent, the solid ion conducting agent could be used in place of a part of the liquid ion conducting agent (for example, Example 1 and Comparative Example 6), the amount of the liquid ion conducting agent was reduced, and bleeding of the liquid ion conducting agent could be reduced. In addition, according to Example 11 and Comparative Example 6, it was found that bleeding of the liquid ion conducting agent was reduced by using it together with the solid ion conducting agent. This was inferred to be due to the interaction between the solid ion conducting agent and the liquid ion conducting agent which were polar materials.

In addition, according to Examples 1, 6, 7, and 9 to 12 and Comparative Examples 5 to 8, it was found that the dispersibility of the electron conducting agent was improved and uniform chargeability was improved when the liquid ion conducting agent was simply used in combination.

In the charging member for electrophotographic equipment according to the present disclosure, when the elastic layer contains (a) an ion conducting agent that is a solid at normal temperature, (b) an ion conducting agent that is a liquid at normal temperature, and (c) an electron conducting agent having an average particle size of 25 to 90 nm and a DBP absorption of 152 ml/100 g or less, constant and excellent uniform chargeability is maintained over a long period and generation of bleeding is reduced in a low temperature and low humidity environment and a high temperature and high humidity environment.

In this case, when the content of the component (b) is 2.0 parts by mass or less with respect to 100 parts by mass of polymer components, bleeding of the component (b) is easily reduced. In addition, when the thickness of the surface layer is in a range of 3.0 to 15 μm, the chargeability is excellent, and an effect of reducing bleeding is excellent.

While embodiments and examples of the present disclosure have been described above, the present disclosure is not limited to the embodiments and the examples, and various modifications can be made without departing from the spirit and scope of the present disclosure.

What is claimed is:
1. A charging member for electrophotographic equipment comprising:
   an elastic layer; and
   a surface layer formed on the outer periphery of the elastic layer, wherein the elastic layer contains components (a) to (c):
   (a) an ion conducting agent that is a solid at 25° C.;
   (b) an ion conducting agent that is a liquid at 25° C.; and
   (c) an electron conducting agent having an average particle size of 25 to 90 nm, and a DBP absorption being in a range of 70 to 130 ml/100 g, and
   wherein a mass content ratio of the components (a) to (c) is (a):(b):(c)=0.4 to 3.0:0.4 to 2.0:10 to 40,
   a content of the component (b) is 2.0 parts by mass or less with respect to 100 parts by mass of polymer components contained in the elastic layer,
   a content of the component (c) is in a range of 10 to 40 parts by mass with respect to 100 parts by mass of polymer components contained in the elastic layer,
   the component (a) and the component (b) are one, two, or more selected from among quaternary ammonium salts and quaternary phosphonium salts,
   anions of the component (a) and the component (b) are bis(trifluoromethanesulfonyl)imide ions or perchlorate ions, and
   a thickness of the surface layer is in a range of 3.0 to 15 μm.

* * * * *